(12) United States Patent
McDonald et al.

(10) Patent No.: US 10,100,602 B2
(45) Date of Patent: Oct. 16, 2018

(54) SELF-PRESSURIZING SOLUBLE ALKALI SILICATE FOR USE IN SEALING SUBTERRANEAN SPACES

(71) Applicants: PQ Corporation, Malvern, PA (US); BYK USA Inc., Wallingford, CT (US)

(72) Inventors: Michael James McDonald, Toronto (CA); Xianglian Li, Mississauga (CA); Brett Howard Cramer, Austin, TX (US); Kelly Paul Short, O'Fallon, MO (US)

(73) Assignees: BYK USA Inc., Wallingford, CT (US); PQ Corporation, Malvern, PA (US)

( * ) Notice: Subject to any disclaimer, the term of this patent is extended or adjusted under 35 U.S.C. 154(b) by 0 days.

(21) Appl. No.: 15/348,491

(22) Filed: Nov. 10, 2016

(65) Prior Publication Data

US 2017/0130116 A1 May 11, 2017

Related U.S. Application Data

(60) Provisional application No. 62/253,834, filed on Nov. 11, 2015.

(51) Int. Cl.

| | |
|---|---|
| *E21B 33/138* | (2006.01) |
| *C09K 8/467* | (2006.01) |
| *C04B 12/04* | (2006.01) |
| *C04B 14/28* | (2006.01) |
| *C04B 22/04* | (2006.01) |
| *C04B 24/10* | (2006.01) |
| *C04B 28/00* | (2006.01) |
| *C04B 28/26* | (2006.01) |
| *C04B 38/02* | (2006.01) |
| *C04B 20/10* | (2006.01) |
| *C09K 8/502* | (2006.01) |
| *C09K 8/504* | (2006.01) |
| *C09K 8/516* | (2006.01) |
| *C04B 103/12* | (2006.01) |
| *C04B 103/42* | (2006.01) |
| *E21B 21/00* | (2006.01) |
| *C04B 111/00* | (2006.01) |

(52) U.S. Cl.
CPC ............ *E21B 33/138* (2013.01); *C04B 12/04* (2013.01); *C04B 14/28* (2013.01); *C04B 20/107* (2013.01); *C04B 20/1011* (2013.01); *C04B 20/1022* (2013.01); *C04B 20/1062* (2013.01); *C04B 22/04* (2013.01); *C04B 24/10* (2013.01); *C04B 28/006* (2013.01); *C04B 28/26* (2013.01); *C04B 38/02* (2013.01); *C09K 8/467* (2013.01); *C09K 8/502* (2013.01); *C09K 8/5045* (2013.01); *C09K 8/516* (2013.01); *C04B 2103/12* (2013.01); *C04B 2103/42* (2013.01); *C04B 2111/0075* (2013.01); *C04B 2111/00724* (2013.01); *C09K 2208/04* (2013.01); *C09K 2208/08* (2013.01); *E21B 21/003* (2013.01)

(58) Field of Classification Search
None
See application file for complete search history.

(56) References Cited

U.S. PATENT DOCUMENTS

| | | | | |
|---|---|---|---|---|
| 3,197,323 | A | | 7/1965 | Rehmar |
| 3,202,214 | A | * | 8/1965 | McLaughlin, Jr. ...... C04B 24/04 166/292 |
| 3,579,366 | A | | 5/1971 | Rehmar |
| 3,709,707 | A | | 1/1973 | Rehmar |
| 4,304,298 | A | | 12/1981 | Sutton |
| 4,676,318 | A | * | 6/1987 | Myers ..................... C09K 8/518 166/292 |
| 4,848,465 | A | * | 7/1989 | Hazlett .................. C09K 8/518 166/270 |
| 4,957,639 | A | * | 9/1990 | Fox .......................... C09K 8/60 166/275 |
| 5,145,012 | A | * | 9/1992 | Hutchins .................. C09K 8/50 166/270 |

(Continued)

FOREIGN PATENT DOCUMENTS

| | | |
|---|---|---|
| DE | 2527830 A1 | 1/1977 |
| GB | 1184864 | 3/1970 |

(Continued)

OTHER PUBLICATIONS

P.H. Krumrine and S.D. Boyce, Profile Modification and Water Control with Silica Gel-Based Systems, SPE 13578 presented at the 1985 SPE International Symposium on Oilfield and Geothermal Chemistry, Phoenix, AZ, Apr. 9-11, 1985.

(Continued)

*Primary Examiner* — Anuradha Ahuja
(74) *Attorney, Agent, or Firm* — Buchanan Ingersoll & Rooney PC

(57) ABSTRACT

Compositions and methods are disclosed for sealing subterranean spaces such as natural or induced fractures, vugs or annular spaces. The composition is composed of a base fluid consisting of a soluble alkali silicate, a gas generating additive, water, solids, and a setting agent. The gas generating additive may be coated or uncoated. The gas generating additive may also be in the form of a slurry. In the case of coated additives, the coating may act as a retarder or an accelerator to the expansion and setting agent of the soluble alkali silica. Similarly, the choice of carrier fluid in a slurry may retard or accelerate the expansion and setting of the alkali silicate-based plug.

6 Claims, No Drawings

(56) References Cited

U.S. PATENT DOCUMENTS

| | | | | |
|---|---|---|---|---|
| 5,168,928 A | * | 12/1992 | Terry | C09K 8/5045 106/633 |
| 6,059,036 A | * | 5/2000 | Chatterji | C04B 28/26 106/605 |
| 6,715,553 B2 | * | 4/2004 | Reddy | C09K 8/38 106/672 |
| 7,131,493 B2 | * | 11/2006 | Eoff | C09K 8/5083 166/295 |
| 7,642,223 B2 | * | 1/2010 | Santra | C09K 8/516 166/281 |
| 7,690,429 B2 | * | 4/2010 | Creel | C04B 28/26 166/279 |
| 8,689,871 B2 | | 4/2014 | Khatri et al. | |
| 2005/0194144 A1 | * | 9/2005 | Vargo, Jr. | E21B 33/13 166/293 |
| 2006/0084580 A1 | * | 4/2006 | Santra | C09K 8/516 507/239 |
| 2006/0231251 A1 | * | 10/2006 | Vargo, Jr. | E21B 33/13 166/250.12 |
| 2006/0234871 A1 | * | 10/2006 | Dalrymple | C09K 8/428 507/211 |
| 2007/0257226 A1 | | 11/2007 | Dimanshteyn | |

FOREIGN PATENT DOCUMENTS

| | | |
|---|---|---|
| JP | 06092752 | 4/1994 |
| JP | 10183812 | 7/1998 |
| JP | 11228252 | 8/1999 |

OTHER PUBLICATIONS

Carter et al.: Expanding Cements for Primary Cementing, Journal of Petroleum Technology, May 1966.

International Search Report and Written Opinion for PCT/US2016/061518, dated Mar. 9, 2017.

* cited by examiner

SELF-PRESSURIZING SOLUBLE ALKALI SILICATE FOR USE IN SEALING SUBTERRANEAN SPACES

This application claims priority to U.S. Provisional Patent Application No. 62/253,834 filed in the United States Patent and Trademark Office on Nov. 11, 2015, which is incorporated herein by reference.

BACKGROUND OF INVENTION

The focus of this invention is on the petroleum industry. People familiar with the art will realize the features of a self-pressurizing soluble alkali silicate-based system can be readily adapted and found useful in industries such as mining and construction. Further the expansion properties may also be used for prevention and correction of subsidence such as in buildings or roadways.

It has been known since the 1920's that soluble alkali silicates such as sodium silicate are an effective means for providing conformance control in a reservoir. The term conformance is a broad term and includes control of excess water production with the goal of improving petroleum recovery and reducing costs. Recently, there has been greater interest in the use of soluble, alkali silicates such as sodium silicate. This resurgence is being driven by the performance properties of soluble alkali silicates as well as the environmentally friendly and low cost nature of sodium silicate.

The chemistry of sodium silicate for conformance has been well documented in the literature. The paper by P. H. Krumrine and S. D. Boyce, Profile Modification and Water Control with Silica Gel-Based Systems, SPE 13578 presented at the 1985 SPE International Symposium on Oilfield and Geothermal Chemistry, Phoenix, Ariz., Apr. 9-11, 1985 is a leading article on the subject. This paper presents the chemistry, properties, benefits, limitations, and methods associated with sodium silicate conformance and provides an extensive list of potential setting agents. This paper is incorporated herein by reference. Also documented have been the use of fillers and bridging materials within a soluble metal silicate. Generally accepted features of soluble alkali silicate systems include;
   initial low viscosity (1-2 centipoise) which promotes penetration
   small molecular weight which promotes penetration
   excellent thermal stability
   excellent chemical stability
   high strength on setting
   flexible set times (instant to several days)
   environmentally friendly
   moderate to low cost
   Commonly cited constraints of soluble alkali silicate-based technology include;
   gels can show syneresis (i.e. prone to shrinking)
   the gel is rigid and prone to fracture The issue of shrinking/contraction is not exclusive to sodium silicate and is known to occur in polymer as well as cement systems. The lack of a tight seal can result in poor zonal isolation leading to gas migration, gas entrapment, and/or excessive water production among other issues. In the case of cement, several methods have been proposed to offset shrinkage. One such technique is the use of gas generating additives. When a suitable metal is added to the cement slurry, the high pH environment results in the production of hydrogen gas. This technology is described in U.S. Pat. Nos. 3,197,323; 3,579,366 and 3,709,707 for use in structural concrete compositions to offset contraction as well as the tendency to settle. The use of gas generating additives for oilwell cement was described by Carter et al: Expanding Cements for Primary Cementing, Journal of Petroleum Technology, May 1966. This article describes the use of zinc, magnesium, iron and aluminum powders to prepare expansive cements. The metal powders react in a cement slurry to produce minute bubbles of hydrogen. U.S. Pat. No. 4,304,298 describes an improved oil well cement slurry for the generation and entrainment of gas. U.S. Pat. No. 8,689,871 describes the difficulty of high reactivity of metals when exposed to a cement slurry and the coatings that may advantageously delay the gas generation reaction.

Unlike cement which sets via a hydration reaction, soluble silicates set via a gelation/polymerization reaction caused by a loss of alkalinity. Soluble silicates can also be set via a precipitation reaction with metal cations. Soluble silicates may also be made to set via a dehydration reaction where the loss of water causes the soluble silicate to thicken and eventually revert back to a glass. The setting mechanisms of soluble silicate function to prevent fluid loss. Alkali silicates may also donate their charge which can react with solid material in the plug and also function as a setting mechanism.

SUMMARY OF THE INVENTION

The invention provides compositions and methods for sealing subterranean spaces such as natural or induced fractures, vugs or annular spaces. The composition is composed of a base fluid consisting of a soluble alkali silicate, a gas generating additive, solids and a setting agent. The gas generating additive may be coated or uncoated. In the case of coated additives, the coating may act as a retarder or an accelerator to the expansion and setting agent of the soluble alkali silicate.

DETAILED DESCRIPTION OF THE PREFERRED EMBODIMENTS

The present compositions represent a cross section of potential formulations. It should be evident there are wide range of additional material that may be added or substituted to the composition without changing the nature of the invention. The technology is demonstrated herein using hydrogen as the generated gas. It is apparent that other types of gas such as nitrogen or oxygen may also be generated in a soluble alkali silicate environment and it is to be distinctly understood that the principles of the present invention apply equally to such systems.

Metals that may generate hydrogen in soluble alkali silicate include but are not limited to: aluminum, iron, magnesium, lithium, sodium, potassium, rubidium, cesium, calcium, barium, strontium, radium, and zinc powders. Gas generation can also be achieved by the use of sparingly soluble metal salts. The metals can be of a different shape and size ranging from fine powders to flake or the metals may be used in a slurry form to prepare a self-pressurizing alkali silicate system. The invention also allows for the use of other types of gas generating additives such as those that release nitrogen. When added to the high alkalinity environment of a soluble, alkali silicate, the metal powder reacts to produce hydrogen gas. The resulting gas causes the soluble silicate to expand and self-pressurize in a confined space. Expansion time can be controlled by several factors to allow for desired reaction times under downhole applications. Similar to expandable cements, it is optimal to have the generation take place between the time of placement in the subterranean open space and the early setting stages of the soluble alkali silicate. The gas generation rate can be controlled by several factors, such as:
- type of metal powder
- reactive surface area of the metal powder
- type of coating
- metal from a sparingly soluble salt
- in the case of slurried material, the choice of carrier fluid
- grade of soluble alkali silicate
- setting agents
- temperature The generation of gas can be further controlled by selection of the soluble alkali silicate. Soluble silicates are produced with varying degrees of alkalinity as measured by the ratio of $SiO_2$ to $Me_2O$ where Me is the alkali metal and is most commonly sodium or potassium. Generally, the low-ratio, more alkali silicates generate gas at a quicker rate. Conditions such as downhole temperature are typically difficult to control; reaction rate can be adjusted by selection of the appropriate ratio soluble alkali silicate. PQ Corporation produces a wide range of soluble, alkali silicate having a weight ratio of $SiO_2$ to $Me_2O$ of generally 1.0 to 8.5. Table 1 provides a cross section of some of the different grades of sodium and potassium silicate as well as specialty soluble alkali silicates. The option exists to fine tune reaction times via the addition of alkali or acid to the soluble alkali silicate system.

TABLE 1

| PQ Corporation Product Name | $SiO_2/Me_2O$ | % $SiO_2$ | % $Me_2O$ | % Solids | |
|---|---|---|---|---|---|
| Sodium/Potassium Silicates | | | | | |
| KASIL ® 1 | 2.5 | 20.8 | 8.3 | 29.1 | Liquid |
| KASIL ® 6 | 2.1 | 26.5 | 12.65 | 39.15 | Liquid |
| EcoDrill ® K45 | 3.0 | 18.0 | 6.0 | 24.0 | Liquid |
| KASOLV ® 16 | 1.6 | 52.8 | 32.5 | 85.3 | Hydrous powder |
| KASIL ® SS | 2.5 | 71.0 | 28.4 | 99.4 | Ground Glass |
| BW ™ 50 | 1.60 | 26.2 | 16.75 | 42.55 | Liquid |
| BJ ™ 120 | 1.80 | 23.7 | 13.15 | 36.85 | Liquid |
| D ™ | 2.00 | 29.4 | 14.7 | 44.1 | Liquid |
| RU ™ | 2.40 | 33.0 | 13.9 | 47.1 | Liquid |
| M ® | 2.58 | 32.1 | 12.4 | 44.5 | Liquid |
| K ® | 2.88 | 31.7 | 11.0 | 42.7 | Liquid |
| N ® | 3.22 | 28.7 | 8.9 | 37.6 | Liquid |
| EcoDrill ® S45 | 4.50 | 21.0 | 4.7 | 26.0 | Liquid |
| SS ® 20 | 3.22 | 75.0 | 23.3 | 99.2 | Ground glass |
| G ® | 3.22 | 61.8 | 19.2 | | Hydrous powder |
| GD ® | 2.00 | 54.0 | 27.0 | | Hydrous Powder |
| Metso Beads ® 2048 | 1.00 | 47.0 | 51.0 | | Granule |
| Other Silicates | | | | | |
| Lithisil ® 25 | 8.2 | 20.5 | 2.5 | 23.0 | Liquid lithium silicate |
| EcoDrill ® AAAS | 1.7 | 27.9 | 16.2 | 45.7 | Aqueous alkali alumino silicate |
| Quram | | | | | Quaternary ammonium silicate |

Gas generation rate can be further controlled in a soluble alkali system by having the metal particles coated or encapsulated with organic or inorganic layers. The coating may be selected to degrade with temperature, water or the presence of alkali. Delay in the generation of gas may range from several minutes to hours. A coating may be selected that will also act as a setting agent for soluble alkali silicate.

Metal particles can be suspended in a slurry. The use of a slurry mitigates handling issues associated with powder metals. The carrier fluid can also function as a setting agent for the alkali silicate. Examples of suitable carrier fluids that can suspend and carry metal while acting to set sodium silicate include but are not limited to acid generating liquids such as propylene carbonate, triacetin, ethyl acetate, among others. The carrier fluid can also serve to retard the expansion reaction via the use of organic carrier fluids, such as mineral oil, polyalphaolefins, polyethylene glycol, polypropylene glycol, among others.

Soluble alkali silicate can be made to set by gelation reaction or a precipitation reaction. The gelation reaction involves the polymerization of silicate molecules brought on by the loss of alkalinity. The previous referenced paper by Krumrine contains an extensive list of acids, aldehydes, polyhydric alcohols, esters, amides, salts and natural materials that may be used of induce the gelation reaction. Gelation times can be controlled from seconds to days depending on choice and concentration of setting agent.

The precipitation reaction involves the reaction of the multivalent metal with the Si—O⁻ group. This results in the formation of a metal silicate. The metal additives used to generate gas can also act as a setting agent. As the metal reacts in a silicate solution to form the corresponding metal hydroxide it become reactive towards the alkali soluble silicate. This imparts further strength to the setting alkali silicate.

The soluble alkali silicate solution can be run with or without solid material. The addition of solid material serves a multi-functional role: cost reduction, set time control, strength enhancement, improved temperature resistance, density control and viscosity control as well as aid in setting and insolubilizing the alkali silicate, to name a few. Examples of some potential filler material include barite, calcium carbonate, clay, walnut hulls, silica, zeolite, hollow glass spheres, fibrous material, fly ash, and the like. The performance of the self-compressing alkali silicate can be further adjusted via the addition of other additives such as viscosifiers, fluid loss additives, surfactants, and the like.

Coated and uncoated aluminum powder as well as zinc powder & flake were provided by BYK. Tables 2a and 2b provides a description of the products. Also provided by BYK were aluminum and zinc in a slurry form. Table 2c provides a description of the carrier fluid and metal. To aid in suspension and dispersion, slurried products also contained trace amounts of wetting, dispersing, and suspending additives.

TABLE 2a

Aluminum Powder

| Sample | Coating | Particle size |
|---|---|---|
| PCA | Organic coated aluminum powder | 5-100 microns |
| PCR | Inorganic coated aluminum powder | 5-100 microns |
| SDF 2-681 | Dedusted aluminum powder | 5-100 microns |
| LSC-895 | Phosphoric acid ester | 5-100 microns |
| LSC-894 | Fatty acid, tall-oil compounds | 5-100 microns |

TABLE 2b

Zinc Powder

| Sample | Shape | Coating | Particle size |
|---|---|---|---|
| Zinc flake | Flake | uncoated | 5-100 microns |
| LSC-912 | Granular | 90-100% zinc, 2.5-10% phosphoric acid ester, 2.5-5% ethyl alcohol | |
| LSC-913 | Granular | 90-100% zinc, 1-2.5% mineral spirits low aromatic, 0.1-1% fatty acid, tall oil compds, 1-2.5% other components | |
| LSC-914 | Flake | 90-100% zinc, 2.5-10% phosphoric acid ester, 2.5-5% ethyl alcohol | |
| LSC-915 | Flake | 90-100% zinc, 1-2.5% mineral spirits low aromatic, 0.1-1% fatty acid, tall oil compds, 1-2.5% other components | |
| GTT | Flake | Steric acid | |
| AT | Flake | Steric acid | |

TABLE 2c

Zinc & Aluminum as a Slurry

| Sample | Metal | Carrier fluid |
|---|---|---|
| RXG-7575-PG | Zinc flake | Polyethylene glycol |
| RXG-7575-PC | Zinc flake | Propylene carbonate |

Example 1

Example 1 shows the dimensional stability, compressive strength, resistance to contraction and seal integrity using expanded sodium silicate vs. non expanded sodium silicate. The self-compressing silicates contain zinc flake while the control were formulated free of zinc. Samples were prepared to the indicated weight percent. PVC piping (1 inch diameter and 2 inch height) sealed on the bottom were filled with 15 g of the indicated composition. Samples were placed in a heated compression chamber for 2 hrs. at 50° C. under 50 psi pressure and then cured for an additional 24 hrs. and 7 days. An Ingstrom Model 3345 was used to measure the compressive strength as well as the pressure to push the plug out of the PVC piping. The extruded plug was weighed and measured to determine the change in density.

TABLE 3

Extrusion Pressure of self-compressing silicate vs. control

| 1:1 silicate:filler | | | | 24 hrs @ 50° C. | | | 7 days @ 50° C. | |
|---|---|---|---|---|---|---|---|---|
| N sil. | CaCO$_3$ | Zinc flake | Lactose | Density, g/cm$^3$ | Extrusion Pressure psi | Comp. Strength psi | Density, g/cm$^3$ | Comp. strength psi |
| 30 g | 30 g | 1.5 g | 1.5 g | 0.63 | 7.5 | 111 | 0.57 | 542 |
| 30 g | 30 g | 1.5 g | 3.0 g | 0.58 | 10.3 | 135 | 0.50 | 605 |
| 30 g | 30 g | 3.0 g | 1.5 g | 0.73 | 6.4 | 204 | 0.60 | 683 |
| 30 g | 30 g | 3.0 g | 3.0 g | 0.55 | 11 | 81 | 0.52 | 547 |
| 30 g | 30 g | 0 g | 3.0 g | 1.87 | 3.4 | 1130 | 1.85 | 1582 |

The expanded samples required a higher degree of force to push out of the mold vs the control. Compressive strength of the expanded samples were lower than the control but this is a reflection of the reduced density. The expanded samples showed signs of deformation under compressive strength testing vs. the more brittle control.

Example 2

Example 2 shows the expansion rate and degree of expansion can be controlled by the alkalinity of the soluble silicate. Samples were placed in clear plastic cup and the level of expansion measured as a function of time. Change in density was used to measure the degree of expansion. Expansion time was measured by visual observation above a start line

TABLE 4 expansion rate vs. alkalinity of soluble silicate

| Soluble Alkali Silicate | Calcium Carbonate | Zinc Flake | Lactose | Initial Density 21° C. | 4 hr Density 21° C. | Final Density (~72 hrs @ 65° C.) |
|---|---|---|---|---|---|---|
| 25 g 2.5 ratio Star ® grade sodium silicate | 25 g | 1.25 g | 1.25 g | 1.8 | 1.09 | 0.69 |
| 25 g 8.9 ratio Lithisil 25 lithium silicate | 25 g | 1.25 g | 1.25 g | 1.8 | 1.71 | 1.55 |

Star® sodium silicate is a mid-ratio alkali silicate or moderately alkaline sodium silicate. Lithisil 8.9 represents the very high ratio alkali silicate or low alkaline lithium silicate. The lower alkalinity lithium silicate took much longer to expand and therefore lose density under equivalent conditions.

Example 2b

As another example of expansion rate as a as a function of alkalinity or ratio of $SiO_2:Me_2O$ is also demonstrated using a range of different ratio sodium silicates. The high ratio, low alkaline S45 showed no expansion under ambient conditions and required a higher temperature environment to generate expansive gas vs. the low ratio BW®. Prepared slurry material were filled to the 15 ml mark of a 50 ml cylinder. The cylinder was sealed and expansion was measured as a function of increased volume in relation to time and temperature. Size restraints limited expansion to a maximum of 3×'s starting volume.

TABLE 4b

Expansion rate vs. ratio of sodium silicate at 50° C.

| Alkali silicate | Silicate ratio $SiO_2:Na_2O$ | $CaCO_3$ | Zinc flake | Initial density | 1 hr 50° C. | 2 hr 50° C. | 4 hr 50° C. | 4 hr 20° C. |
|---|---|---|---|---|---|---|---|---|
| Ecodrill® S45-50 g | 4.5 | 50 g | 2.5 g | 1.67 | 1.67 | 1.67 | 1.25 | 1.67 |
| N® silicate-50 g | 3.2 | 50 g | 2.5 g | 1.8 | — | 0.9 | 0.64 | 1.54 |
| BW® silicate-50 g | 1.6 | 50 g | 2.5 g | 1.8 | 0.6 | 0.6 | 0.6 | 0.6 |

Example 3

Example 3 illustrates the expansion rate being a function of using coated vs. non-coated metal. Time to max expansion time was measured using different fillers in a low ratio aqueous alkali aluminosilicate Filler material included, barite, calcium carbonate, and flyash.

TABLE 5

Time to >75% max expansion

| Silicate & filler/ | Aluminum powder | Time to expand at room temp |
|---|---|---|
| 1:1 of AAAS:Barite + 5% $ZnCO_3$ | 1.5% PCR | ~30 min |
| | 1.5% PCA | ~5 min |
| | 1.5% SDF | Immediate |

TABLE 5-continued

Time to >75% max expansion

| Silicate & filler/ | Aluminum powder | Time to expand at room temp |
|---|---|---|
| 1:1 of AAAS:$CaCO_3$ + 5% $ZnCO_3$ | 1.5% PCR | ~30 min |
| | 1.5% PCA | ~5 min |
| | 1.5% SDF | Immediate |
| 1:1 of AAAS:Fly ash | 1.5% PCR | ~10 min |
| | 1.5% PCA | ~5 min |
| | 1.5% SDF | Immediate |
| | 0.75% PCR | ~10 min |
| | 0.75% PCA | ~5 min |
| | 0.75% SDF | Immediate |

The inorganic coated aluminum (PCR) showed distinctly slower expansion times vs. the uncoated control. By being able to slow down the expansion rate via a coating on the metal, the option exists for formulating the self-compressing alkali silicate to be pumped and placed to a greater depth prior to the start of expansion.

Example 4

Example 4 illustrates that expansion and setting can take place without the addition of filler or extender material. The only solids present being the zinc. Lactose is dissolved into N® grade sodium silicate and then the zinc powder is mixed into the slightly viscous solution. Materials are then 1 inch diameter form with a sealed bottom. The prepared samples are then put into a pressure vessel at 100 psi pressure and 50° C. for 4 hrs. As well as expansion, the example shows that zinc can react with zinc to impart increased strength and water resistance

TABLE 6

Expansion and compressive strength without the use of fillers

| N Sodium Silicate | Zinc flake AT % | g | Lactose % | g | temp | Initial density g/cm³ | Final Density, g/cm³ | Compressive Strength psi |
|---|---|---|---|---|---|---|---|---|
| 30 g | 2.5% | 0.75 g | 2.50% | 0.75 g | 50° C. | 1.46 | 0.81 | 39 |
| | 2.5% | 0.75 g | 5.00% | 1.5 g | | | 0.74 | 26 |
| | 5.0% | 1.5 g | 2.50% | 0.75 g | | | 0.66 | 26 |
| | 5.0% | 1.5 g | 5.00% | 1.5 g | | | 0.76 | 28 |
| | 0.0% | 0 g | 2.50% | 0.75 g | | | 1.4 | 12 |
| | 0.0% | 0 g | 5.00% | 1.5 g | | | 1.4 | 11 |

For placement into fine fractures, channels or microannuli it is desirable to be solids free or close to solids free to allow for greater depth of penetration and mitigate the chance that suspended material will bridge at fracture openings.

Example 5

Example 5 shows that expansion can also take place using metal salts. The use of metal salts can also generate hydrogen and allow for slower expansion at higher temperatures. Zinc carbonate ($ZnCO_3$) was as selected as a sparingly soluble salt of zinc. Expansion shows the degree of expansion under at atmospheric conditions. Aqueous alkali alumino silicate was used as the base sodium silicate. Barite was used as an inert filler and triacetin was used as a setting agent for the silicate. Test specimens were prepared by filling up the 50 ml of plastic cylinder, the cylinder was first curing overnight at 75° C., the firm set specimen was then taken out from plastic cylinder and continue curing for overnight at 150° C./300° F. and 250° C./482° F. The original volume of test specimen has expanded to ~1.5× volume after curing overnight at the high temperature of 150° C. and 250° C. with very good thermal strength.

TABLE 7

Expansion at high temperatures using a sparingly soluble metal salt

| Setting agents | | | Volume expansion | | | Compressive strength, psi | | |
|---|---|---|---|---|---|---|---|---|
| AAAS | Barite | Triacetin | ZnCO₃ | 75° C. | 150° C. | 250° C. | 75° C. | 150° C. | 250° C. |
| 50 g | 50 g | 3.9 g | 2.1 g | 1.0 × V | ~1.5 × V | ~1.5 × V | >1500 | 1370 | 1484 |

At lower temperatures there is a strong set but no expansion, the increase to higher temperature allows for sufficient elemental zinc to generate hydrogen. This reaction allows for the use of the system at higher temperatures without premature reaction.

Example 6

On-site formulation of expandable silicate-based plugs allows for increased flexibility in formulating to specific subterranean conditions. For defined and routine conditions it is operationally simpler to have a "add water and stir" product. A further advantage to dry blending material is mitigation of handling issues associated with powder metals. Table 8a shows an all-in-one product formulated by dry blending granular sodium metasilicate, class F fly ash and inorganic coated aluminum powder (PCR-214). This blend was mixed with tap water to an approximate weight ratio of 2.5:1, dry blended material to water. A closed 50 ml plastic cylinder was filled to ⅓ of volume and sealed. The contained mixture was aged overnight (~16 hrs.) at 20° C., 50° C. and 85° C.

Table 8b demonstrates a dry blended product made using a spray dried 2.0 ratio sodium silicate powder. The lower alkalinity of the 2.0 ratio showed less expansion under similar test conditions.

Example 7

For certain subterranean applications such as lost circulation, it is often necessary to formulate to a low density to avoid exceeding the fracture gradient. This example shows a low density and higher temperature expandable alkali silicate system. In this set of experiments a higher ratio, 3.2 ratio sodium silicate was used with urea as a setting agent. Hollow glass spheres (i.e. Potters Q-Cel) were used as light weight additive to adjust the density of other fillers. The filler of 1:1 of Q-Cel:CaCO₃ blend gave an approximate starting density of ~1.1 g/cm³.

Table 9a compares zinc in a slurry form used a slurry material consisting of 48% zinc flake and 52% polyethylene glycol. The zinc slurry in polyethylene glycol allowed for a longer expansion and set while the propylene carbonate allowed for quick set with less expansion.

TABLE 8a

Dry blended high alkali mixture

| Metso beads 2048 | Flyash F | Aluminum PCR-214 | Water | Expansion at 20° C. | Density g/cm³ | Strength after 7 days, psi | | |
|---|---|---|---|---|---|---|---|---|
| | | | | | | 20° C. | 50° C. | 85° C. |
| 10 g | 90 g | 0.0 g | 40 g | No expansion | 1.67 | 1264 | 1500 | 1390 |
| 7.5 g | 91.5 g | 1.0 g | 40 g | 2.0 × volume | 0.83 | 100 | 136 | 215 |
| 10.0 g | 89.5 g | 0.5 g | 40 g | 2.7 × volume | 0.62 | 109 | 182 | 162 |

TABLE 8b

Dry blended lower alkalinity

| Sodium silicate | Flyash F | Aluminum PCR-214 | Water | Expansion at 20° C. | Density g/cm³ | Strength, psi 20 hrs @ 20° C. |
|---|---|---|---|---|---|---|
| GD, 10 g | 89 g | 1.0 g | 50 g | 1.2 × volume | 1.4 | 21 |

TABLE 9a

Light weight SPS prepared with different forms of zinc

| Silicate and setting aid solution | | | Filler blend | | | Set Time | Density g/cm³ |
|---|---|---|---|---|---|---|---|
| N silicate | Urea | Water | Q-Cel | CaCO₃ | Zinc | | |
| Control-100 g | 10 g | 10 g | 40 g | 40 g | — | — | 1.1 |
| 100 g | 10 g | 10 g | 30 g | 30 g | 2.5 g as Zn slurry RXG- | ~4 hrs at 90° C. | 0.55 |

TABLE 9a-continued

Light weight SPS prepared with different forms of zinc

| Silicate and setting aid solution | | | Filler blend | | | Set Time | Density g/cm³ |
|---|---|---|---|---|---|---|---|
| N silicate | Urea | Water | Q-Cel | CaCO₃ | Zinc | | |
| 100 g | 10 g | 10 g | 30 g | 30 g | 7575 PG (polyethylene glycol) 2.7 RSG-7575 PC Propylene carbonate | ~10 minute set at 25° C. | |

Example 8

The presence of oil-based drilling fluids can adversely affect the performance of plugging/blocking material such as Portland cement. Example 8 shows the self-pressurizing silicate plug tolerant towards oil-based drilling fluid. The oil-based drilling fluid being a typical 85:15 water in oil emulsion-based fluid obtained from the field. The zinc flake was made into a slurry using triacetin as the carrier fluid and silicate setting agent. The mixture is shown to be tolerant to the presences of a high level of contamination by oil-based drilling fluids. Walnut hull was used as a filler material.

A 50 ml plastic cylinder with lid is used, fills 35 g of mixture up to 25 ml (density 1.4 g/cm3), close the lid and the sample was cured overnight at 20° C., 50° C. and 75° C.

All mixtures remained pumpable up to 1 hour and start expanding at room temperature. The presence of oil based drilling fluid decreased the amount of expansion but had minimal effect on compressive strength.

TABLE 10

| AAAS | Walnut | Zinc flake LSC-915 | Triacetin | Oil based mud | Density after 20 hrs, g/cm³ | | | Strength after 20 hrs, psi | | |
|---|---|---|---|---|---|---|---|---|---|---|
| | | | | | 20° C. | 50° C. | 75° C. | 20° C. | 50° C. | 75° C. |
| | | | | Initial density 1.4 | | | | | | |
| 100 g | 25 g | 2.5 g | 7.5 g | 0 g | 0.59 | 0.57 | 0.60 | 23 | 40 | 35 |
| 100 g | 25 g | 2.5 g | 7.5 g | 10 g | 0.89 | 0.77 | 0.83 | 36 | 36 | 36 |
| 100 g | 25 g | 2.5 g | 7.5 g | 20 g | 0.92 | 0.81 | 0.81 | 27 | 42 | 54 |

Example 9

Degree of expansion can be control by adjusting shape (particle vs. flake) and type of coating. The larger surface area of flake providing for greater expansion vs. powder. Example also shows the type of coating impacting degree of expansion and final strength of set material.

TABLE 11a

Effect of metal shape and coating on expansion and setting

| Silicate Ecodrill® AAAS | Filler CaCO₃ | Expansion Agent zinc | Setting Agent lactose | After 20 hrs @ 50° C. | | After 20 hrs @ 75° C. | |
|---|---|---|---|---|---|---|---|
| | | | | density | Comp. Strength psi | density | Comp. Strength psi |
| 50 g | 50 g | no zinc | 8.1 g | 1.82 | 810 | 1.82 | 1180 |
| 50 g | 50 g | LSC-912 | 8.1 g | 1.44 | 234 | 1.45 | 405 |
| 50 g | 50 g | LSC-913 | 8.1 g | 1.36 | 422 | 1.20 | 787 |
| 50 g | 50 g | LSC-914 | 8.1 g | 1.30 | 280 | 1.25 | 311 |
| 50 g | 50 g | LSC-915 | 8.1 g | 1.20 | 514 | 0.99 | 788 |
| 50 g | 50 g | GTT | 8.1 g | 1.05 | 622 | 0.81 | 857 |

TABLE 11b

Effect of metal shape and coating on expansion and setting

| Silicate N® | Filler CaCO₃ | Expansion Agent Zinc | Setting Agent lactose | After 20 hrs @ 50° C. density | After 20 hrs @ 50° C. Comp. Strength psi | After 20 hrs @ 75° C. density | After 20 hrs @ 75° C. Comp. Strength psi |
|---|---|---|---|---|---|---|---|
| 50 g | 50 g | no zinc | 4.5 g | 1.82 | 290 | 1.82 | 1470 |
| 50 g | 50 g | LSC-912 | 4.5 g | 1.29 | 534 | 1.28 | 1026 |
| 50 g | 50 g | LSC-913 | 4.5 g | 1.02 | 507 | 0.97 | 508 |
| 50 g | 50 g | LSC-914 | 4.5 g | 0.97 | 229 | 0.95 | 265 |
| 50 g | 50 g | LSC-915 | 4.5 g | 0.71 | 300 | 0.66 | 395 |
| 50 g | 50 g | GTT | 4.5 g | 0.68 | 451 | 0.61 | 389 |

Example 10

For subterranean applications can use a two component placement technique to achieve quicker more dramatic set times. A two component system will involve either sequentially pumping and placing one component and then pumping in the second component. Alternatively, material can be pumped simultaneously pumped down to separate pipes or channels and then combined and mixed at the desired location. Demonstrated for a lost circulation application is a potassium silicate based drilling fluid (10% by weight of Ecodrill 317) weighted to a specific gravity of 1.4 using barite with xanthan gum and polyanionic cellulose as viscosity and fluid loss additives. Upon mixing the material set in minutes but did allow for some expansion into a firm but compressible material. The indicated weight of the zinc slurry was added to a clear 50 ml plastic cylinder. The indicated weight of drilling fluid was then added and lightly mixed. The contained was sealed and placed in an oven at 50° C.

TABLE 12 downhole mixing of reactive components

| Drilling Fluid containing 10% potassium silicate | Zinc Slurry | Initial density | 30 minute at 50° C. |
|---|---|---|---|
| 12.5 g | RXG-PC - 2.5 g | 1.37 | .96 |
| 12.5 g | RXG-PG - 12.5 g | 1.37 | 1.02 |

Example 11

A higher level of gas generation can be obtained in a controlled manner by increasing the metal content in the self-compressing silicate system. Table 13 shows a pumpable solution prepared using different combinations of filler material and a 10% loading of zinc on liquid sodium silicate. A 50 ml cylinder was filled to 10 ml and sealed. Samples were aged at the indicated temperature.

TABLE 13

Expansion rate with higher metal loading

| Sodium Silicate | Filler CaCO₃ | Filler Hollow Glass Spheres | Filler Zeolite A | Zinc Flake | Starting Density | Density after 16 hrs 20° C. | Density after 16 hrs 50° C. | Density after 16 hrs 85° C. |
|---|---|---|---|---|---|---|---|---|
| S45 40 g | 10 g | 10 g | — | 4.0 g | 1.0 | — | 0.77 | 0.33 |
| S45 50 g | — | 5 g | 20 g | 4.0 g | 1.1 | — | 0.77 | 0.44 |
| N silicate 40 g | 10 g | 10 g | — | 4.0 g | 1.2 | 0.48 | 0.32 | 0.24 |
| N silicate 50 g | — | 5 g | 20 g | 5.0 g | 1.3 | 0.43 | 0.34 | 0.26 |

Although the present invention has been described with respect to its application in subterranean environments, it is to be distinctly understood that the present invention can also be used for certain ground applications.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for sealing subterranean spaces comprising the step of introducing into a downhole a base fluid containing a soluble alkali silicate, a gas generating additive, a setting agent, water, and solids, whereby the soluble alkali silicate promotes a gas generating reaction wherein the gas generating additive reacts with water to produce a gas, causing the soluble alkali silicate to expand and self-pressurize in a subterranean space, thereby sealing the subterranean space.

2. The method of claim 1 wherein said gas generating additive is one of a metal and a metal salt, wherein the soluble alkali silicate promotes an oxidation reaction of the one of a metal and a metal salt with water.

3. A method for sealing a subterranean space comprising the steps of:
   a. introducing into a downhole a base fluid containing a soluble alkali silicate, a gas generating additive, water, solids, and a setting agent; and
   b. said soluble alkali silicate promoting a gas generating reaction of said gas generating additive with water to produce a gas;
   wherein said gas produced by said reaction causes said alkali silicate to expand and self-pressurize in said downhole, thereby sealing the subterranean space.

4. The method of claim 3 further comprising the step
   (c) said setting agent causing said expanded alkali silicate to set in said downhole.

5. The method of claim 4 wherein said gas generating additive is one of a metal and a metal salt, wherein the soluble alkali silicate promotes an oxidation reaction of the one of a metal and a metal salt with water.

6. The method of claim 5 wherein said setting agent is one of a metal and a metal salt.

\* \* \* \* \*